Patented Feb. 6, 1945

2,368,833

UNITED STATES PATENT OFFICE 2,368,833

X-RAY CONTRAST COMPOSITION

Siegwart Hermann, New York, N. Y.

No Drawing. Application May 24, 1941,
Serial No. 395,023

2 Claims. (Cl. 167—95)

This invention relates to processes for increasing the concentrations of suspensions.

It will be of importance for technical as well as medical purposes to get suspensions of higher concentration. This holds true in the production of plastics which are to be worked into homogenous matter with stiff materials without using larger amounts of fluids. In painting as well as in the production of paints, it is necessary to produce suspensions of high density and great covering capacity.

Another kind of application of the processes, according to this invention, is in the medical field. Pastes for external use or drinkable suspensions (e. g., for X-ray contrast examinations) have to be produced as suspensions of high concentration.

The invention is described in the following where my process has been applied to barium salts. Suspensions of barium salts, e. g., sulphate of barium, are used in the manufacture of paints (permanent white) and in medical applications (drinkable suspensions of barium sulphate for X-ray diagnosis).

To produce a suspension of barium sulphate (for X-ray purposes) which is still drinkable, 50 grams of barium sulphate are suspended in 100 grams of water. If less water is added, the mixture stiffens and becomes undrinkable. If 100 grams of barium sulphate are thoroughly mixed with 50 grams of water, a very stiff paste is the result; it cannot be poured from the container.

Now, I have discovered that by adding special substances which I have found and which will be described below, it is possible to completely change the physical condition of the suspensions. For instance, by adding as small amounts as 1.4 grams to 4 grams of the substance to the stiff paste containing 100 grams of barium sulphate and 50 grams of water, the mixture will become liquid and almost as fluid as pure water. Even if another 50 grams of barium sulphate are added, the mixture will still be easily drinkable.

The compounds to be used, according to this invention, are obtained from algae, seaweed, fuci (*fucus vesiculosus*, *fucus serratus*, *laminaria digita*, etc.), etc.

For many technical purposes, it will be sufficient to use the above materials in pulverized form as an addition.

For other purposes, e. g., for medical purposes, the raw materials are to be extracted with water or alkaline solutions, the salts being separated from the solutions by known methods, for instance dialysis. Another process for obtaining the substances adapted to perform the process, according to my invention, consists in freeing the organic acids contained in seaweed, etc., e. g., laminaric acid, algine, etc. This may be performed by treating seaweed with water to which is added alkalis or ammonia. Preferably, the extract is condensed. Acids (HCl, $H_2SO_4$, etc.) are added until an acid reaction is reached and the organic acids (laminaric acid, algine, etc.) are precipitated. The precipitate is separated and washed, and as much alkalis or ammonia is added as is necessary to dissolve it again. The solution containing the salts of the organic acids are evaporated or distilled and dried. Preferably, a small amount of barium sulphate is added before the evaporation of the solution to facilitate the pulverization of the substance. The resulting powder is the additional substance to be used according to this invention.

In using acids from seaweeds, especially laminaric acid, for drinkable suspensions for X-ray purposes, care is to be taken that the laminaric acid is not precipitated by the strong acids present in the stomach in cases of hyperacidity. In fact, only a part should be precipitated to increase adherence of the paste to the mucus membranes of the stomach. Complete precipitation of laminaric acid can be avoided by adding to the X-ray solution, or to the salts of the seaweed acids, weak alkaline substances, e. g., magnesium oxide. The addition of carbonates is to be avoided, because of their foam-forming effect. The addition of calcium salts should also be avoided, because of formation of difficultly soluble laminaric salts.

In the following are given examples of the production of additional substances usable according to my invention, and examples showing the use of such products.

Example 1

Algae, seaweed, etc., are treated with water weakly acidulated to remove the principal amount of the salts. Then the material is dried and ground. 10 lbs. of this material are mixed with 300 lbs. of distilled water, giving the mixture a neutral or weakly alkaline reaction. After several hours, the liquid is removed by decanting or centrifugal action. This treatment is repeated. The extracts are collected, condensed to one tenth of the original amount and subjected to dialysis. The resulting colloids which are perfectly free of salts, are evaporated or distilled, dried and ground.

Example 2

10 lbs. of an extract dried according to Example 1 are mixed without having been subjected to the dialysis with 300 lbs. of water. Into the mixture containing the fully dialyzed substance, 3 lbs. of $2nH_2SO_4$ are introduced, precipitating the organic acids. The acid paste is stirred for five hours at a temperature of 60° C. The precipitated organic acids are then removed by centrifugal action. They are thoroughly washed with pure water and treated with NaOH (10%) until a weak acid reaction is reached. By adding ammonia, the neutralization is completed. Then 8 lbs. of purest barium sulphate are added, mixed and concentrated in a water bath. To the still not stiffened paste, 4 lbs. of magnesium oxide are added.

Example 3

100 parts (by weight) of barium sulphate are mixed with 50 parts of water. To the resulting stiff mixture 4 parts of an addition, according to Example 1 or 2, are added. The mixture regains its liquid condition.

Now, it is possible to add 50 parts of barium sulphate without altering the drinkable condition of the liquid.

By adding 50 more parts of barium sulphate, the mixture becomes stiffer again.

By adding 1.5 parts of the addition mentioned above, the mixture regains liquidity.

It is possible to incorporate 300 parts of barium sulphate in 50 parts of water in the manner described and still retain sufficient liquidity to permit it to be poured easily from a container.

This is of great importance for medical purposes, especially for X-ray diagnoses, because when such a concentrated drinkable emulsion reaches, e. g., the stomach, a small volume of it covers the mucous membranes with a thin layer containing a large quantity of barium sulphate. The advantage is the possibility of getting very contrasty X-ray pictures, allowing the early realization of changes in the relief of the mucous membranes, an achievement that is impossible when the stomach is wholly filled with barium sulphate paste. A recognizable reproduction of the mucous membranes by using normal suspensions of barium sulphate is impossible, because the density of the suspension is not sufficient.

In the described manner, it is possible to produce concentrated emulsions usable for paints, etc.

I have described only preferred embodiments of my invention, but it is understood that changes and omissions may occur without departing from the spirit of my invention.

What I claim is:

1. A composition of matter to be used for making drinkable suspensions of barium sulphate for X-ray diagnosis, comprising 100 to 300 parts of barium sulphate 1.4 to 4 parts of soluble salts of the acids contained in materials of the class consisting of seaweed, algae, fuci, kelp and varic, said composition being suspended in 50 parts of water.

2. A composition of matter to be used for making drinkable suspensions of barium sulphate for X-ray diagnosis, comprising 100 to 300 parts of barium sulphate 1.4 to 4 parts of soluble salts of the acids contained in materials of the class consisting of seaweed, algae, fuci, kelp and varic and magnesium-oxide, said composition being suspended in 50 parts of water.

SIEGWART HERMANN.